United States Patent
Elwakil et al.

(10) Patent No.: US 7,635,504 B2
(45) Date of Patent: Dec. 22, 2009

(54) CURABLE WHITE INKJET INK

(75) Inventors: Hamdy A. Elwakil, Hockessin, DE (US); Patrick F. McIntyre, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 266 days.

(21) Appl. No.: 11/799,896

(22) Filed: May 3, 2007

(65) Prior Publication Data

US 2007/0259986 A1 Nov. 8, 2007

Related U.S. Application Data

(60) Provisional application No. 60/798,290, filed on May 5, 2006.

(51) Int. Cl.
*B05D 11/00* (2006.01)
*C09D 11/00* (2006.01)

(52) U.S. Cl. .................. 427/466; 522/83; 522/182; 522/183

(58) Field of Classification Search ............ 522/83; 347/466; 427/466
See application file for complete search history.

(56) References Cited

U.S. PATENT DOCUMENTS

| | | | |
|---|---|---|---|
| 5,085,698 A | 2/1992 | Ma et al. | |
| 5,231,131 A | 7/1993 | Chu et al. | |
| 5,439,514 A | 8/1995 | Kashiwazaki et al. | |
| 5,519,085 A | 5/1996 | Ma et al. | |
| 5,640,187 A * | 6/1997 | Kashiwazaki et al. | 347/101 |
| 5,708,095 A | 1/1998 | Grezzo Page et al. | |
| 6,005,023 A | 12/1999 | Anton et al. | |
| 6,506,899 B1 | 1/2003 | Simms | |
| 6,593,390 B1 * | 7/2003 | Johnson et al. | 522/74 |
| 6,644,799 B2 * | 11/2003 | Han-Adebekun et al. | 347/100 |
| 6,720,041 B2 * | 4/2004 | Yoshino et al. | 428/32.24 |
| 6,769,766 B2 | 8/2004 | Suzuki et al. | |
| 6,989,054 B2 | 1/2006 | Tanabe et al. | |
| 7,026,368 B2 | 4/2006 | Yamada et al. | |
| 7,278,730 B2 * | 10/2007 | Elwakil | 347/105 |
| 7,361,692 B2 * | 4/2008 | Thetford | 516/27 |
| 2003/0052952 A1 * | 3/2003 | Tanabe et al. | 347/100 |
| 2005/0215664 A1 | 9/2005 | Elwakll et al. | |
| 2005/0282928 A1 | 12/2005 | Lin et al. | |
| 2007/0060670 A1 | 3/2007 | Ellis | |
| 2007/0188535 A1 | 8/2007 | Elwakll et al. | |
| 2008/0210122 A1 * | 9/2008 | Magdassi et al. | 106/31.05 |

* cited by examiner

*Primary Examiner*—Susan W Berman
(74) *Attorney, Agent, or Firm*—Angela J. Grayson; Dennis G. Morrell

(57) ABSTRACT

The present invention pertains to a radiation-curable white inkjet ink and, more particularly, to a radiation-curable inkjet white ink comprising a specified titanium dioxide with at least two dispersants. The first is an acidic polyester dispersant and the second is an acrylic structured copolymer dispersant. Ink sets containing the white inks are also described.

11 Claims, No Drawings

CURABLE WHITE INKJET INK

CROSS-REFERENCE TO RELATED APPLICATION

This application claims the benefit of U. S. Provisional Application Ser. No. 60/798,290 filed on May 5, 2006 which is hereby incorporated by reference in its entirety.

BACKGROUND OF THE INVENTION

The present invention pertains to a radiation-curable white inkjet ink and, more particularly, to a radiation-curable white inkjet ink comprising a polymerizable vehicle and a titanium dioxide which is dispersed by at least two dispersants that is curable on exposure to radiation such as ultraviolet light.

Inkjet imaging techniques have become very popular in commercial and consumer applications. Ink jet printers operate by ejecting ink onto a receiving substrate in controlled patterns of closely spaced ink droplets. By selectively regulating the pattern of ink droplets, ink jet printers can produce a wide variety of printed features, including text, graphics, images, holograms and the like. Moreover, ink jet printers are capable of forming printed features on a wide variety of substrates, as well as three-dimensional objects in applications such as rapid prototyping.

Inkjet inks must meet stringent performance requirements in order for the inks to be appropriately jettable and for the resultant printed features to have the desired mechanical, chemical, visual and durability characteristics. In particular, inks must have relatively low viscosity when jetted, yet must be able to form accurate, durable images on the desired receiving substrate. For example, a typical ink will have a viscosity in the range of 3 to 30 centipoise at the jetting temperature. The low viscosity, however, poses a substantial challenge to achieving printed features with good mechanical and durability characteristics.

Aqueous based inks, although very successful in the home and small office market, have certain drawbacks in other applications. For example, in industrial printing, the substrate is typically nonporous and the aqueous ink must be dried, which is equipment intensive and time consuming. Also, the printed material needs to be handled carefully during the relatively lengthy drying period. Water-based inks are also compatible only with a limited range of substrates, and images formed using water-based inks typically require a protective overlaminate for outdoor applications.

Solvent-based inks, which are most commonly used in industrial applications, contain relatively volatile organic solvents. These inks dry more readily than aqueous inks and tend to be somewhat more durable in outdoor applications. However, the solvents require careful handling and may be toxic and/or flammable. These inks also tend to be compatible with only a limited range of substrates.

To avoid using conventional solvents, inks with polymerizable diluent have been developed. The diluent generally comprises one or more reactive monomers that are polymerized by exposure to radiation (radiation curable) such as ultraviolet light, electron beam energy and the like. The cured diluent forms a polymer film that provides durability to the print and requires no drying. The diluent mixture, which is also the ink vehicle, is chosen to provide appropriate ink viscosity. The reactive monomer content in the diluent also impacts the physical properties of the printed image (durability, flexibility, elasticity, gloss, hardness, chemical resistance, stiffness and so forth) and is optimized to achieve the desired properties.

Inkjet inks must possess proper dot gain in order to form images with attractive appearance. Dot gain refers to the degree to which an ink jetted drop spreads out upon application to a substrate. If an ink jetted drop spreads out too much on the substrate, then poor edge definition and intercolor bleed is observed. On the other hand, if an ink jetted drop spreads insufficiently upon application to the substrate, poor color density results. Dot gain characteristics depend upon a number of factors including the ink jet composition, the nature of the substrate, the substrate temperature, and the interfacial tension between the ink and the substrate. Many of the currently available radiation curable inks show favorable dot gain characteristics on some substrates, but not on others. Preferably a curable inkjet ink would be formulated to provide good dot gain characteristics and good appearance on a broad range of substrates.

There are numerous descriptions of white inks formulations that are claimed to be adequately formulated for use in ink jet system. U.S. Pat. No. 5,439,514 describes an ink containing both a pigment and titanium dioxide or alumina. U.S. Pat. No. 6,769,766 a white ink and colored UV inks where the tank for white ink is larger than the other tanks and agitated. U.S. Pat. No. 6,989,054 describes an aqueous slurry of a phosphate treated titanium dioxide and a specific particle size distribution. U.S. Pat. No. 7,026,368 a titanium dioxide which is treated with silica and the polymeric dispersant used has a basic functional group. U.S. Pat. No. 6,593,390 has an example using a titanium dioxide white pigment and a single basic dispersant group. Co-owned U.S. patent application Ser. Nos. 10/872,856 (filed Jun. 21, 2004), Ser. No. 11/070,714 (filed Mar. 2, 2005), and 60/717,438 (filed Sep. 15, 2005) all describe white inks suitable for certain ink jet needs (the disclosures of which are incorporated by reference herein for all purposes as if fully set forth).

It is, therefore, desirable to provide radiation curable white inks with improved characteristics, such as image durability and/or cure speed, and that are also suitable for use on a broad range of substrate types.

SUMMARY OF THE INVENTION

In one aspect the present invention pertains to a radiation curable white inkjet ink composition for ink jet recording comprising
 (i) at least one titanium dioxide white pigment
 (ii) a polymerizable liquid vehicle
 (iii) at least one additional ingredient selected from the group of consisting of a colorant, a photosensitizer, a photosynergist, a photoinitiator and a surfactant,
 (iv) at least one of the titanium dioxide pigments is alumina-treated and stabilized by a mixture of pigment dispersants consisting essentially of
  a. at least an acidic polyester dispersant, and
  b. at least an acrylic structured copolymer dispersant.

The titanium dioxide pigment used herein is white, thus the inkjet inks of the present invention are preferably white. Non-white colored inks can also be made by utilizing one or more additional colorants in the ink.

In accordance with another aspect of the present invention, there is provided an inkjet ink set comprising a plurality of colored, pigmented inks, at least one of which is an inkjet ink (and preferably a radiation curable white inkjet ink) as set forth above.

In another aspect, the present invention pertains to a method for ink jet printing, comprising in any workable order the steps of:
 (a) providing an ink jet printer that is responsive to digital data signals;

(b) loading the printer with a substrate to be printed;
(c) loading the printer with a radiation curable inkjet white ink as set forth above;
(d) printing an image onto the substrate using said inkjet ink, in response to the digital data signals, and forming thereby a printed article; and
(e) curing the image on the printed article.

In one embodiment, the curing step comprises the step of exposing the printed article to a radiation suitable for curing the ink printed thereon. The radiation is preferably ultraviolet light.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

The present invention provides a polymerizable ink, that is made from a dispersed titanium dioxide dispersion where two different dispersants are used. The first dispersant is an acidic polyester dispersant and the second is an acrylic structured copolymer dispersant. The titanium dioxide pigment used for the dispersion is treated with alumina. The polymerically dispersed titanium dioxide dispersion and ink made therefrom have improved stability to agglomeration upon storage. As a result, the ultimate ink formulation provides desirable properties such as good hiding, uniform coverage, good clarity, image durability, and adhesion to the substrates when applied to surfaces, and is especially useful when used with other polymerizable inks.

Unexpectedly, by use of the acidic polyester dispersant in combination with the acrylic structured copolymer dispersant as listed above, an aqueous inkjet ink can be formulated in which settling of alumina-treated titanium dioxide particles is reduced. Further unexpected reduction in settling of particles is achieved using a blend of the acidic polyester dispersant in combination with the acrylic structured copolymer dispersant as listed above. Moreover, even when settling does occur, the settling is "soft" settling, meaning the titanium dioxide pigment can be readily re-dispersed and rejuvenated by low shear mixing so as not to result in plugging of inkjet printhead nozzles. Low shear mixing includes, for example, simple shaking (e.g., by hand or movement of the inkjet printhead) or stirring with an impeller or mixing blades at speeds of less than about 500 rpm wherein no grinding occurs. In contrast, "hard" settling occurs with many titanium dioxide slurries of the prior art. Also, if a settling occurs that leads to a gooey material, it is unlikely that failed dispersion or ink can be easily redispersed for use.

Titanium Dioxide Pigment

Titanium dioxide ($TiO_2$) pigment useful in the present invention may be in the rutile or anatase crystalline form. It is commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have an average size of less than about 1 micron (1000 nanometers). Preferably, the particles have an average size of from about 100 to about 950 nanometers, more preferably from about 175 to about 750 nanometers, and still more preferably from about 200 to about 500 nanometers. These titanium dioxide particles are commonly called pigmentary $TiO_2$.

For applications demanding white color with some degree of transparency, the pigment preference is "nano" titanium dioxide. "Nano" titanium dioxide particles typically have an average size ranging from about 10 to about 200 nanometers, preferably from about 20 to about 150 nanometers, and more preferably from about 35 to about 75 nanometers.

In addition, unique advantages may be realized with multiple particle sizes, such as opaqueness and UV protection. These multiple sizes can be achieved by adding both a pigmentary and a nano grade of $TiO_2$.

The titanium dioxide is preferably incorporated into an ink formulation by first preparing a dispersion of titanium dioxide using the first and second dispersant in a polymerizable vehicle, followed by mixing with the other ink components. The amount of titanium dioxide present in the titanium dioxide dispersion is preferably from about 15 wt % to about 80 wt %, based on the total dispersion weight. For slurries wherein the majority of titanium dioxide particles are of a pigmentary size, and preferably those in which the average particle size is greater than about 150 nanometers up to about 1 micron, the amount of titanium dioxide in the dispersion is preferably from about 50 wt % to about 75 wt %, based on the total weight of the dispersion. For dispersions wherein the majority of titanium dioxide particles are of "nano" size, and preferably those in which the average particle size is from about 10 nanometers to about 200 nanometers, the amount of titanium dioxide in the dispersion is preferably from about 20 wt % to about 50 wt %, and more preferably from about 25 wt % to about 35 wt %, based on the weight of the dispersion.

The surface of the titanium dioxide is treated with alumina to improve performance. The method of surface-treating the titanium dioxide includes aqueous treatment and vapor phase treatment for improvement of the weatherability and dispersibility. More specifically, the aqueous treatment, for example, is performed by dry-grinding titanium dioxide, then wet-grinding it by adding water and a dispersant different from the first and second dispersant described above thereto, adding to the mixture an aqueous solution of salts of metal for the surface treatment, and adding to the mixture an alkali or an acid to neutralize the solution, whereby the titanium dioxide is coated with the hydrated oxide thus produced. As a common surface treating agent, alumina is often used to improve wettability of the titanium dioxide during dispersion while silica is often used to improve the durability. Consequently, titanium dioxides for a coating composition can be classified roughly into those which are not surface-treated, those which are surface-treated with alumina, and those which are surface-treated with alumina and silica. The preferred titanium dioxide is treated with alumina. The co-oxidized or co-precipitated alumina is preferably present as the metal oxide in an amount from about 0.1 wt % to about 20 wt %, more preferably from about 0.5 wt % to about 5 wt %, and still more preferably from about 0.5 wt % to about 3.0 wt %, based on the total titanium dioxide pigment weight.

The titanium dioxide pigment may also bear one or more metal oxide surface coatings. These coatings may be applied using techniques known by those skilled in the art. Examples of metal oxide coatings include silica, alumina, alumina-silica, boric acid, and zirconia, among others. Such coatings may optionally be present in an amount of from about 0.1 wt % to about 10 wt %, and preferably from about 0.5 wt % to about 3 wt %, based on the total weight of the titanium dioxide pigment. These coatings can provide improved properties including reducing the photoreactivity of the titanium dioxide. Commercial examples of such coated titanium dioxides include TiPure® R700 and R900 (alumina-coated, available from E.I. DuPont de Nemours, Wilmington Del.), RDIS (alumina-coated, available from Kemira Industrial Chemicals, Helsinki, Finland), TiPure® R796 (alumina and phosphate treated from DuPont), TiPure® R706 (silica and alumina treated, available from DuPont, Wilmington Del.). The preferred alumina-treated titanium dioxides are the RDIS and R700.

The titanium dioxide pigment may also bear one or more organic surface coatings, such as, for example, carboxylic acids, hydrocarbon waxes and organic grinding aids, and their reaction products with the titanium dioxide surface. The amount of organic surface coating, when present, generally ranges from about 0.01 wt % to about 6 wt %, preferably from about 0.1 wt % to about 3 wt %, more preferably about 0.5 wt % to about 1.5 wt %, and still more preferably about 1 wt %, based on the total weight of the pigment.

Dispersants

Two or more dispersants are employed in the present ink jet inks to stabilize the titanium dioxide. The dispersants are added to a titanium dioxide and this mixture is subject to dispersive forces to achieve a stable dispersion. This dispersion in turn is used to prepare the ink formulation. Titanium dioxide because of its high density can be difficult to adequately disperse in ink jet liquids because of the need for relatively low viscosity liquids especially in its settling stability, and compatibility with ink jet jetting systems. The dispersants are not neutralized with any amine or inorganic base.

The first dispersant is an acidic polyester dispersant. Candidate polyester type dispersants are exemplified by SOLSPERSE 22000, SOLSPERSE 24000SC, SOLSPERSE 22000GR, SOLSPERSE 26000, SOLSPERSE 27000, SOLSPERSE 28000, SOLSPERSE 36000, SOLSPERSE 36600 and SOLSPERSE 38500, trade names, available from Avecia Co.; and DISPARLON DA70350, DISPARLON DA705, DISPARLON DA725, DISPARLON DA860 and DISPARLON DA873A, trade names, available from Kusumoto Chemicals Ltd. While these can have both acidic and basic groups, the polyester dispersants must have acidic functionality. For example, Solsperse 36000 can be used as a first dispersant for the titanium dioxide. The polymer type dispersant may be, as its state at room temperature, liquid, solid or gel-like, any of which may be used.

The second dispersant is an acrylic structured copolymer dispersant. The term "structured copolymer" means a polymer having a block, branched or graft structure. Especially preferred are AB or BAB block copolymers such as those disclosed in U.S. Pat. No. 5,085,698, ABC block copolymers such as those disclosed in disclosed in U.S. Pat. No. 5,519,085, and graft polymers such as those disclosed in U.S. Pat. No. 5,231,131. Other examples of the structured copolymer dispersants are described in U.S. Pat. Nos. 5,708,095; 6,005,023; and 6,506,899 All of the above disclosures are incorporated by reference herein for all purposes as if fully set forth.

The second dispersant is preferably an acidic acrylic structured copolymer dispersant and the preferred acid content is between about 0.65 and about 6 milliequivalents per gram of polymer, and the most preferred being between about 0.90 and about 1.75 milliequivalents per gram of polymer. The acidity can come from carboxylic acids, phosphorous acids, sulfur acids groups that are incorporated during the preparation of the dispersant. All polymers may also be derived from monomers that have functional groups including, but not limited to, hydroxyls, amides, epoxides and ethers. Epoxy containing dispersants can have the epoxy group opened with phosphoric acid leading to an opened epoxy group and a phosphate (in an acid form) incorporated into the dispersant.

An example of dispersant with a functional group is the graft comb acrylic structured copolymer dispersant [70] nBA/GMA/MA (45.5/9/145.5)//[30] MMA/MAA (71/29). The GMA component in combinations with vehicles and photoactivators described below can be reactive under UV light conditions.

As indicated above, acrylic copolymer dispersants are generally preferred. Such copolymers preferably include at least one pigment adsorbing segment and at least one stabilizing segment. Not to be held to any particular theory, it is thought that the adsorbing segments function, in part, to attach the copolymer dispersant to a pigment's surface, while the stabilizing segments function, in part, to maintain dispersion stability of the pigment in the polymerizable vehicle.

The location of the adsorbing segment and the stabilizing segment in the acrylic polymer dispersant may vary depending upon the structure of the acrylic copolymer dispersant. Acrylic polymer dispersants used in the present invention are structured copolymers, such as block or graft copolymers, with block or graft copolymers being preferred.

A block copolymer of the present invention may have an AB, ABA, or ABC structure, for example. At least one of the blocks, A, B or optionally C must be an adsorbing segment. At least one of the blocks, A, B or optionally C must be a stabilizing segment.

Graft copolymer dispersants, as described above, can also be in the present invention and have a backbone segment and a side chain segment. Either a backbone segment or a side chain segment must be an adsorbing segment. Either a backbone segment or a side chain segment must be a stabilizing segment. Preferably a backbone segment is an adsorbing segment and a side chain segment is a stabilizing segment.

The acrylic copolymer dispersants useful herein generally have a number average molecular weight of about 1,000 to about 25,000 (preferably about 2,000 to about 10,000). An adsorbing segment has a number average molecular weight of about 1,000 to about 10,000 (preferably about 1,000 to about 5,000). A stabilizing segment has a number average molecular weight of about 1,000 to about 15,000 (preferably about 1,000 to about 5,000).

Either or both the stabilizing segment or the adsorbing segment, preferably the adsorbing segment, also contains at least one of the functional groups listed above to provide improved stability in the mixed dispersant system of the present invention. Preferably up to 20 mole % of these groups are present in the adsorbing segment. Optionally up to 30 mole % of these functional groups can be present in the stabilizing segment. The stabilizing segment may also contain such groups for enhanced compatibility with the co-dispersant and/or the polymerizable vehicle.

Polymerizable Vehicle

"Vehicle" is a general term to refer to the liquid medium, or carrier, for the colorant and/or any additives present in an ink. The "polymerizable vehicle" is a diluent consisting essentially of reactive liquid material.

By reactive material we mean material containing one or more unsaturated carbon-carbon bonds polymerizable by radiation. In accordance with the invention, the reactive material typically comprises a mixture of reactive components (diluents) such as reactive monomers, oligomers, and mixtures thereof. Oligomer is sometimes known as a prepolymer. Non-limiting examples of monomers are acrylates, methacrylates and alkoxylated and polyalkoxylated derivatives thereof. Non-limiting examples of oligomers (prepolymers) are polyester-, urethane- and epoxy-acrylates.

The reactive liquid material preferably consists essentially of reactive liquid components (diluents) that can be polymerized to form a polymer film. Herein the term diluent is often used in place of vehicle to emphasize the difference between a reactive vehicle/diluent and the more traditional non-reactive aqueous- and solvent-based vehicles.

The vehicle for the inventive white inks can be monofunctional monomer such as linear alkyl acrylate selected from n-octyl acrylate, n-nonyl acrylate, n-decyl acrylate and any combination thereof. In a preferred embodiment, the linear alkyl acrylate is a mixture of n-octyl acrylate and n-decyl acrylate.

The vehicle can further contain difunctional monomers such as an ethoxylated 1,6-hexanediol diacrylate, such as depicted by the following formula:

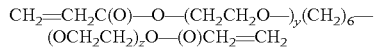

wherein y and z are integers. Preferably, the moles of ethoxylation (y+z) per molecule is on average between about one and about three, and more preferably on average about two.

The vehicle may further comprise a multifunctional monomer such as propoxylated trimethylolpropane triacrylate, such as depicted by the following formula:

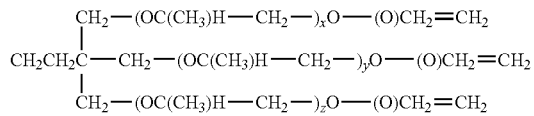

wherein x, y and z are integers. Preferably, the moles of propoxylation (x+y+z) per molecule is on average between about two and about four, and more preferably on average about three.

The vehicle may optionally comprise other reactive liquid components including monofunctional and multi-functional (di-, tri- or higher-functional) monomers. By mono-, di-, tri- and higher-functional monomers is meant compounds having, respectively, one, two, three or more functional groups (such as unsaturated carbon-carbon and/or epoxy) which are polymerizable by radiation, especially (but not exclusively) ultraviolet light.

Monofunctional polymerizable monomers include, for example, styrene, alpha-methylstyrene, substituted styrene, vinyl esters, vinyl ethers, N-vinyl-2-pyrrolidone, (meth)acrylamide, N-substituted (meth)acrylamide, nonylphenol ethoxylate (meth)acrylate, 2-(2-ethoxyethoxy)ethyl(meth)acrylate, β-carboxyethyl(meth)acrylate, cycloaliphatic epoxide, α-epoxide, 2-hydroxyethyl(meth)acrylate, (meth)acrylonitrile, maleic anhydride, itaconic acid, methyl(meth)acrylate, (meth)acrylic acid, octyl(meth)acrylate, isononyl(meth)acrylate, 2-ethylhexyl(meth)acrylate, lauryl(meth)acrylate, isobutyl(meth)acrylate, isodecyl(meth)acrylate, dodecyl(meth)acrylate, n-butyl(meth)acrylate, hexyl(meth)acrylate, isooctyl(meth)acrylate, isobornyl(meth)acrylate, N-vinylcaprolactam, stearyl(meth)acrylate, hydroxy functional caprolactone ester, hydroxyethyl(meth)acrylate, hydroxymethyl(meth)acrylate, hydroxypropyl(meth)acrylate, hydroxyisopropyl(meth)acrylate, hydroxybutyl(meth)acrylate, hydroxyisobutyl(meth)acrylate, tetrahydrofurfuryl(meth)acrylate, combinations of these, and the like. The use of "(meth)acrylate" is intended to refer both to "acrylate" and "methacrylate".

Multifunctional monomers include, for example, pentaerythritol triacrylate, hexanediol diacrylate, dipropyleneglycol diacrylate, tri(propylene glycol)triacrylate, neopentylglycol diacrylate, bis(pentaerythritol)hexa-acrylate, and the acrylate esters of ethoxylated or propoxylated glycols and polyols, for example, propoxylated neopentyl glycol diacrylate and ethoxylated trimethylolpropane triacrylate. Also included are: triethylene glycol divinyl ether, diethylene glycol divinyl ether, 1,4-cyclohexanedimethanol divinyl ether and ethylene glycol monovinyl ether.

Inks comprising the vehicle described above may be cured (polymerized) by any suitable form of electromagnetic radiation, including electron beam, visible light and/or, more preferably, ultraviolet light. The mixture of polymerizable vehicle components achieves a balance of desirable performance criteria such as low viscosity, fast cure speed and durable, flexible cured films. The vehicle is also advantageous from the standpoint of low skin and eye irritation.

Typically, the total of all mono-functional and multi-functional polymerizable monomers amounts to at least about 50% by weight of the total weight of ink.

The vehicle requires no additional solvent and, preferably, any non-polymerizable diluent is avoided (substantially free of non-polymerizable solvents). However, the presence of some solvent can be tolerated, and may be present incidentally through use of certain additives that are less than 100% active. In one embodiment, non-polymerizable diluent (organic solvent) is less than about 3%, preferably less than about 1%, of the formulation by weight, based on the total weight of ink.

Colorant

The inventive ink set which contains the white ink and at least one other colored ink. The colorant for the colored inks in the ink set can be any suitable colorant but, from the standpoint of resistance to fade in outdoor applications, pigment colorants are preferred. The inventive white ink may be combined with a pigmented ink to obtain an ink with both a titanium dioxide and a pigment present. Sometimes these combination inks are described as pastel colored inks.

The colored pigments by definition are substantially insoluble in the vehicle and, in order to be used, must be stabilized to dispersion. The colored pigments can be stabilized to dispersion by separate dispersing agents, such as polymeric dispersants or surfactants. The dispersants for the pigments are not limited to the first and second dispersants described above for the titanium dioxide. Alternatively, a colored pigment surface can be modified to chemically attach dispersibility-imparting groups and thereby form a so-called "self-dispersible" or "self-dispersing" pigment (hereafter "SDP(s)") which is stable to dispersion without separate dispersant. "Stably dispersed" means that the colored pigment particles are uniformly distributed and reasonably resistant to settling, flocculation and particle growth (ripening) under normal use conditions.

For dispersant-stabilized colored pigment dispersions, the choice and amount of dispersant will generally depend upon the nature and concentration of the pigment, and composition of the diluent. Examples of suitable materials may be found among dispersants sold under the trade names of Solsperse™ (Noveon), EFKA and BYK® (Byk Chemie). Mixtures of dispersants and mixtures of one or more dispersants with one or more dispersant synergists may be employed. Detailed teaching of pigment milling and millbase let down can be found, for example, in *Paint Flow and Pigment Dispersion*, Temple C. Patton, Wiley Interscience 1979 (ISBN #0-471-03272).

Colored pigments useful in the invention may be organic or inorganic. Suitable inorganic pigments include carbon black, iron oxides, etc, while suitable organic pigments include phthalocyanines, anthraquinones, perylenes, carbazoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides and anthrapyrimidines.

Useful organic pigments include those described in *The Colour Index*, Vols. 1-8, Society of Dyers and Colourists, Yorkshire, England. Nonlimiting examples included those having the following designations: Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24 and Pigment Blue 60; Pigment Brown 5, Pigment Brown 23 and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 151, Pigment Yellow 154, Pigment Yellow 155, Pigment Yellow 156 and Pigment Yellow 175; Pigment Green 1, Pigment Green 7, Pigment Green 10 and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60 and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207 and Pigment Red 224; Pigment Violet 19, Pigment Violet 23, Pigment Violet 37, Pigment Violet 32 and Pigment Violet 42; and Pigment Black 6 and Pigment Black 7.

Mixtures of colorants may be employed, if desired, including mixtures of dyes, mixtures of pigments, and mixtures of one or more dyes with one or more pigments.

Preferred colored pigments include Pigment Blue 15:3, Pigment Blue 15:4, Pigment Yellow 155, Pigment Red 122, and a complex of Pigment Red 202 and Pigment Violet 19.

Useful colored pigment particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

Other Components

Additives (components other than vehicle and colorant) may be present in the ink to improve the properties or performance. Additives include, for example, surfactants, defoamers, photoinitiators, photosynergists, stabilizers against deterioration by heat or light, deodorants, flow or slip aids, biocides and identifying tracers.

The inventive inks do not have added salts that increase the conductivity, which should be less than about 70 μmho/cm, and more preferably less than about 45 μmho/cm. Added salts can be detrimental to drop-on demand ink jet printer systems.

The radiation curable white inks of the present invention preferably include photoinitators, photosynergists and photosensitizers.

Examples of radical photoinitiators include 2,2-dimethyl-2-hydroxy-acetophenone; 1-hydroxy-1-cyclohexyl-phenyl ketone; 2,2-dimethoxy-2-phenylacetophenone; 2,4,6-trimethylbenzyl-diphenyl-phosphine oxide; Benzophenone; blends of bis(2,6-dimethoxybenzoyl)-2,4,4-trimethyl pentyl phosphine oxide and 1-phenyl-2-hydroxy-2-methyl propanone; blends of bis(2,6-dimethoxybenzoyl)-2,4,4-trimethyl pentyl phosphine oxide and 1-hydroxycyclohexyl-phenyl ketone; bis(2,4,6-trimethylbenzoyl)phenylphosphine oxide; and camphorquinone. Examples of cationic photoinitiators include iodonium and sulfonium salts. Preferred photoinitators include 2-benzyl-2-dimethylamino-1-(4-morpholinophenyl)-butan 1-one, and/or 2-methyl-1-(4-(methylthio)phenyl)-2-morpholino-propan-1-one.

Combinations of one or more photoinitiators may be used.

Examples of photoactivators and photosynergists include ethyl-4-(dimethylamino)benzoate, N-methyidiethanolamine and 2-ethylhexyldimethylaminobenzoate. Such materials will generally be required only for free-radical curing. 1-chloro-4-propoxythioxanthone and isopropyl thioxanthone (mixture of 2- and 4-isomers) have been used as sensitizers for α-amino acetophenones. Combinations of one or more photoactivators and photosynergists can be used.

In some embodiments, a radiation curable white inkjet ink of the present invention will comprise a surfactant and, more preferably, a surfactant mixture comprising a fluorosurfactant and an acetylenic diol surfactant.

Fluorinated surfactants include surfactants represented by the following formula:

wherein R(f) is a perfluoroalkyl group having 6 to 22 carbon atoms, Q is a divalent bridging group, A is a water-soluble group, and n is 1 or 2.

The bridging Q group may be a diradical of an alkyl, aryl or alkylaryl group containing less than 10 carbon atoms, and may contain heteroatoms such as S, O and N. The linkage between the bridging Q group and the A group may be ether, ester, amide or sulfoamido, provided it is stable under the conditions of use.

The A group may be selected, for example, from —(OCH$_2$CH$_2$)$_x$OH, wherein x is 1 to 12; —COOM and —SO$_3$M, wherein M is hydrogen, ammonium, amine or an alkali metal such as lithium, sodium or potassium; —PO$_4$(Z)$_y$, wherein y is 1-2 and Z is hydrogen, ammonium, amine or an alkali metal such as lithium, sodium or potassium; —NR$_3$X, wherein R$_3$ is an alkyl group of 1 to 4 carbon atoms and X is an anionic counterion selected from the group consisting of halides, acetates, sulfonates and zwitterionic groups. Preferably, the A group is an ethylene oxide group of no greater than 8 to 9 monomer units.

Suitable fluorinated surfactants include those available from E. I. du Pont de Nemours and Company (Wilmington, Del.) under the tradename Zonyl®, and from 3M Company (Minneapolis, Minn.) under the tradename Fluorad®. They may be used alone or in any combination. The specific surfactant(s) selected will vary with other components in the ink and the properties of the ink printed adjacent to it. It is important that the ionic character of the selected fluorinated surfactant be compatible with other components in the inks to avoid precipitation or flocculation. In one embodiment, the fluorinated surfactant should be non-ionic.

Some examples of suitable fluorinated surfactants are shown in the following Table 1:

TABLE 1

| Fluorinated Surfactants | | | |
|---|---|---|---|
| R(f) | Q | A | n |
| $F(CF_2CF_3)_{3-8}$ | $CH_2CH_2SCH_2CH_2$ | $CO_2Li$ (a) | 1 |
| $F(CF_2CF_2)_{3-8}$ | $CH_2CH_2$ | $PO_4(NH_4)_2$ (a) | 1 |
| $F(CF_2CF_3)_{3-8}$ | $CH_2CH_2$ | $PO_4NH_4$ (a) | 2 |
| $F(CF_2CF_3)_{3-8}$ | $CH_2CH_2$ | $(OCH_2CH_2)_xOH$ (b) | 1 |

(a) Counter ions other than lithium and ammonium are also useful
(b) x is 1-10

The selected concentration will vary with the ink system, efficiency of the fluorinated surfactant, properties of companion ink(s), and the intended media. Generally, sufficient fluorinated surfactant will be added to provide adequate wetting of hydrophobic media surfaces. Preferred fluorinated surfactants include fluoroalkyl alcohol substituted monoether with polyethylene glycol, and telomer B monoether with polyethylene glycol.

Acetylenic diol surfactants are characterized by the 2-butyne-1,4-diol nucleus. The alcohol groups are optionally ethoxylated and the alkyne nucleus is further substituted with alkyl groups. An exemplary acetylenic diol surfactant is depicted by the following structure:

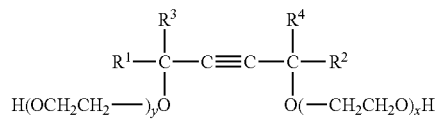

wherein $R^1$ are $R^2$ are independently branched or linear alkyls having 3 to 12 carbons, $R^3$ are $R^4$ are independently hydrogen or methyl, x and y are integers, and x+y is 0 to about 16.

Commercial examples include the Surfynol® and Dynol™ series of surfactants from Air Products (Allentown, Pa., USA). Preferred in some embodiments are Surfynol® 104 and Dynol™ 604, which are available as concentrated surfactant with substantially no solvent.

Surfynol® 104 can be depicted by the following structure:

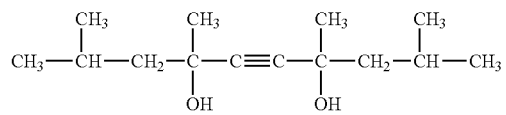

The mixture of surfactants is typically present in the amount of from about 2 wt % to about 6 wt %, and preferably from about 2.5 wt % to about 4.5 wt %, based on the total weight of the ink composition. The surfactants in the mixture are chosen such that the mixture provides sufficient wetting of hydrophobic surfaces.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

Titanium dioxide is preferably present in the (white) inks of this invention in a range of from about 1 wt % to about 30 wt % (solids), more preferably from about 3 wt % to about 25 wt % (solids), based on the total weight of the ink.

The inks of the present invention, and titanium dioxide dispersion used in those inks, preferably have an overall dispersant to pigment weight ratio (D/P) of from about 0.0025:1 to about 0.25:1, preferably from about 0.05:1 to about 0.175:1, and more preferably from about 0.075:1 to about 0.14:1. The overall dispersant to pigment ratio is the sum total of D/P contributions from each dispersant present.

The amount of overall dispersant which includes the first acidic polyester and the second acrylic structured copolymer dispersant is present in the white inks of this invention in the range of about 0.0025 to about 8 wt %, more preferably 0.01 to 6 wt % based on the total weight of the ink.

For the first and second dispersants the weight ratio can range from 1:10 to 10:1.

For example, the amount of vehicle in an ink is typically in the range of about 50% to about 99.8%, and preferably about 60% to about 98.0%, by weight based on total weight of the ink.

For the colored inks in the ink sets the, colorant will generally be present in amounts up to about 12%, and more typically in the range of about 1% to about 9%, by weight based on total weight of the ink. The amount of dispersant for the colored pigments employed (or dispersant and synergist where used) will depend upon the choice and concentration of the colored pigment, and is typically based on the amount of colorant. Dispersants can be employed at a colored pigment-to-dispersant weight ratio in the range of about 1:3 to about 4:1. For organic pigments, the dispersant amount will usually be in the range of about 15 to about 100% by weight, and preferably from about 20 to about 75% by weight, based on the weight of the pigment. For inorganic pigments, lower concentrations may be acceptable, e.g. about 5% or less.

Other ingredients (additives), when present, generally comprise less than about 15% by weight, based on the total weight of the ink.

When surfactants, defoamers, photoinitiators, photosynergists, stabilizers against deterioration by heat or light, deodorants, flow or slip aids, biocides and identifying tracers are used, these additives are individually present in amounts typically in a range of from about 0.01 wt % to about 6 wt %, based on the total weight of the ink.

Ink Properties

Jet velocity, separation length of the droplets, drop size, and stream stability are greatly affected by the surface tension and the viscosity of the ink. The surface tension will typically be in the range of about 15 dyne/cm to about 50 dyne/cm and more typically in the range 15 dyne/cm to about 35 dyne/cm. Viscosities are typically no greater than 35 cP, and more typically in the range of about 3.0 cP to about 20.0 cP at printhead operating temperature. The physical properties are compatible with a wide range of ejecting conditions, i.e., driving voltage, frequency and pulse width of ink jet printing device, and the shape and size of the nozzle. The inks have excellent ink jet storage stability for a long period and do not clog in an ink jet apparatus. They are useful with a variety of printheads, but are especially useful for piezo and similar printheads.

Ink Sets

Ink sets contain the white ink described above and a plurality of other inks. The non-white inks of the ink set contain other colorants and black.

The additional colorant in the inks of the ink sets of the present invention is preferably a pigment. By definition, pigments do not form (to a significant degree) a solution in the vehicle and must be dispersed.

Traditionally, pigments are stabilized to dispersion by dispersing agents, such as polymeric dispersants or surfactants. More recently though, so-called "self-dispersible" or "self-dispersing" pigments (hereafter "SDP(s)") have been developed. As the name would imply, SDPs are dispersible in a vehicle without dispersants.

A preferred black pigment is carbon black.

The term "ink set" refers to all the individual fluids an inkjet printer is equipped to jet. For color printing an ink set will typically include at least a white(W) ink and one other ink commonly chosen from a cyan(C), magenta (M), and yellow (Y) ink. Commonly a black (K) ink is also included. In addition to the typical WCMY(K) inks, ink sets may further comprise one or more "gamut-expanding" inks, including different colored inks such as an orange ink, a green ink, a red ink, a violet ink and/or a blue ink, and combinations of full strength and light strengths inks such as light cyan and light magenta.

Printing Strategies

When the inventive white ink is printed with colored inks, the white ink may be printed in a variety of combinations relative to the colored inks. The white ink may be printed first as a background for the inks. In this case. the white ink may be printed as an extensive underlayer, or its printing can be controlled to print an underlying white layer that would enhance the colored printing. Various levels of printing of the white ink can achieve different accents, shading etc. The white ink may also be printed after a colored image is printed. In this case the substrate might be a transparent sheet and the viewer might view the transparent sheet from the opposite side of the printing. The white can be included as solid backing layer or printed to improve the image. Another printing option can have the white and the colored inks printed essentially simultaneously to achieve optimal color images. An example of method of printing a white ink simultaneously with colored inks has been described in the co-owned U.S. Patent Application No. 60/773,291 (filed Feb. 14, 2006). Mixing the inventive white ink with other colored inks to obtain lighter colored inks, often called pastel inks is yet another printing option for using the inventive white ink.

Substrates

The inks may be employed for printing on to a wide variety of substrates, both absorbent and non-absorbent including paper, glass, plastic and metal, e.g. steel, copper and aluminum, but are particularly suitable for printing on to plastics to provide a strongly bonded print of good definition and optical density. The plastic can, but need not, be pre-treated, for example by flame, plasma etch or corona treatment to raise the surface energy. Plastic substrate can be in the form of a film including but not limited to single and multi-layer constructions of acrylic-containing films, polyvinylchloride-containing films, (including vinyl, plasticized vinyl, reinforced vinyl, vinyl/acrylic blends), urethane-containing films, melamine-containing films, polyvinylfluoride-containing films and polyvinylbutyral-containing films.

Printing Method and Post Treatment

The inks of the present invention can be applied with any suitable printer, many of which are available commercially. Examples of commercial UV printers include those available from the following vendors: DuPont ("CromaPrint 22UV"), Vutek ("PressVu" series of printers), Durst ("Rho" series of printers), Nur ("Tempo"), Leggett & Plaft ("Virtu" series of printers), and Sericol/Inca Digital ("Columbia", "Eagle" and "Spyder" series of printers). These printers include, or make available, suitable UV light sources to cure the printed inks.

EXAMPLES

The invention will now be further illustrated by, but not limited to, the following examples. Ingredient amounts are listed as weight percent of the total weight of concentrate or ink, unless otherwise noted. The chemical identity of commercial ingredients is as follows in Table 2.

TABLE 2

Ingredients and Abbreviations

| Tradename or Abbreviation | Identity |
|---|---|
| [1]Solsperse ™ 39000 | Polymeric Dispersant |
| [1]Solsperse ™ 36000 | Polymeric Dispersant; with acidic polyester structure |
| [2]Cinquasia RT 355-D | Magenta pigment (Complex of PV19 and PR202) |
| [3]Photomer ® 4361 | Ethoxylated (2)-1,6-hexanediol diacrylate, (2 moles average ethoxylation) |
| [4]SR 492 | Propoxylated trimethylolpropane triacrylate (3 moles average propoxylation) |
| [5]ODA-N | n-octyl acrylate, n-decyl acrylate mixture |
| [2]Irgacure ® 907 | 2-methyl-1-[4-(methylthio)phenyl]-2-(4-morpholinyl)-1-propanone |
| [2]Irgacure ® 369 | 2-Benzyl-2-(dimethylamino)-1-[4-(4-morpholinyl)phenyl]-1-butanone |
| [4]ITX | Isopropylthioxanthone |
| [4]EDB | Ethyl-p-N,N-dimethylamino benzoate |
| [6]Zonyl ® FSO-100 | Nonionic fluoro surfactant |
| [7]Dynol ™ 604 | Acetylenic diol surfactant |
| [7]Surfynol ® 104 | Acetylenic diol surfactant |
| [8]BYK ® 348 | Silicone surfactant |
| TRPGDA | Tripropylene Glycol Diacrylate |
| [4]ESACURE KTO 46 | Mixture of: 2,4,6-trimethylbenzoyl phosphine oxide, 2,4,6-trimethylbenzophenone, 4-methlbenzophenone, Oligo(2-hydroxy-2-methyl-1-(4-(1-methylvinyl)phenyl)propanone) |
| [9]TPO | Diphenyl (2,4,6-trimethylbenzoyl)phosphine oxide |
| [9]Laromer LR 8956 | tiertiery amine |

[1]Noveon, Inc. (Charlotte, NC, USA).
[2]Ciba Specialty Chemicals (Newport, DE, USA).
[3]Cognis Corporation (Ambler, PA, USA).
[4]Sartomer Company (Exton, PA, USA).
[5]Cytec Industries Inc. (West Paterson, NJ, USA).
[6]E. I. du Pont de Nemours and Company (Wilmington, DE, USA).
[7]Air Products and Chemicals (Allentown, PA, USA).
[8]Byk Chemie USA (Wallingford, CT, USA).
[9]BASF Chemicals, (Florham, NJ, USA)

Acrylic Structured Copolymer Dispersant Preparation

The dispersants were used as 25% to 66% by weight solutions in common organic solvents. The amount of dispersant listed in the examples below was total weight of the added solution, not the active ingredients. Where ratios of dispersants to pigments are described, the ratio is given as active ingredients.

Structured Polymer Dispersant 1 is an acrylic graft copolymer containing acid functionality in its pigment adsorbing backbone prepared using the Special Chain Transfer, SCT, method as described in Chu et al. U.S. Pat. No. 5,231,131 issued Jul. 27, 1993. Note in this patent description the dispersant is routinely neutralized. For this inventive ink the dispersants are not neutralized.

Structured Polymer Dispersant 1 {[70] nBA/AA/MA (45.5/9.0/45.5)//[30] MMA/MM (71/29)} was prepared in 2 steps. The first step is the formation of a macromonomer which eventually forms the side chains. The second step is reacting the macromonomer with the backbone constituents to form the macro branched copolymer.

Step 1. Preparation of Macromonomer 1: MMA/MM (71.2/28.8) The macromonomer was prepared from the following ingredients.

Portion 1: Methyl methacrylate (MMA) 142.47 g (grams); Methacrylic acid monomer (MM) 38.33 g Isopropanol 222.75 g Portion 2: Isopropyl-bis(borondifluorodimethyl Glyoxim) 0.01 g Isopropanol 12.73 g 2,2-azobis(2,4-dimethylvaleronitrile) (Vazo® 52 0.17 g by DuPont Co., Wilmington, Del.) Methyl ethyl ketone 9.18 g Portion 3: Isopropanol 10.68 g Portion 4: Methyl ethyl ketone 27.54 g Isopropanol 38.19 g diaquabis(borondifluorodiphenyl glyoximato) 0.03 cobaltate (11), 2,2'-azobis(2,4-dimethylvaleronitrile) (Vazo 1.91 g, Portion 5: Methyl methacrylate (MMA) 94.98 Methacrylic acid (MAA) 57.49 Isopropanol 100.51

Total 756.97

Portion 1 was charged to a 12-liter flask (equipped with a thermometer, stirrer, addition funnels, heating mantle, reflux condenser, and nitrogen blanket) and heated under a nitrogen blanket to its reflux temperature in about 20 minutes. Portion 2 was added as one shot and the composition was held at its reflux temperature for about 5 minutes. Portion 3 was used as a rinse for the container and lines from Portion 2. Portion 4 and 5 were added simultaneously while the reaction was held at reflux. The addition of Portion 4 took 330 minutes to complete and addition of portion 5 took 240 minutes to complete.

After adding Portion 4 and Portion 5, the reaction continued for additional 15 minutes at reflux and then cooled to room temperature. The resulting macromonomer solution had the composition of MMA/MAA 71.2%/28.8%). Solvent was stripped off in a vacuum and the macromonomer was used below to form the graft copolymer. The macromonomer had a solids of 38.1%, a weight average molecular weight of 2,000 gm/mole, a number average molecular weight of 4,000 gm/mole and the polydispersity was 2.0.

Step 2. Preparation of Graft Copolymer: [70] nBA/AA/MA (45.5/9.0/45.5)//[30] MMA/MAA (71/29)

The graft copolymer was formed by charging a reactor equipped as above and the following ingredients were employed.

Portion 1: n-Butyl Acrylate (nBA) 19.51 g Acrylic Acid (M) 3.86 g Methyl Acrylate (MA) 19.51 g MACROMONOMER I (prepared above) 369.95 g Isopropanol 7.45 g Portion 2: Butyl Acetate 15.34 g Benzoyl Peroxide 0.37 g Portion 3: Isopropanol 5.845 g Portion 4: n-Butyl Acrylate (NBA) 143.06 g Acrylic Acid (M) 28.30 g Methyl Acrylate (MA) 143.06 g Portion 5: Isopropanol 10.50 g Portion 6: 2,2'-azobis(2,4-dimethylvaleronitrile) (VaZo™ 52 2.86 g by DuPont Co., Wilmington, Del.) Isopropanol 41.29 g Methyl Ethyl Ketone 10.65 g Portion 7: Isopropanol 8.47 g Total 830.00 g The reactor was inerted with nitrogen. Portion 1 was heated to reflux temperature over a 20 minute period. Portion 2 is the initiator solution and was charged to the reactor in 2 shots with 10 min hold. The reaction was held at reflux for 10 minutes. Portion 3 was rinse for Portion 2. Portion 4 was charged to monomer feed tank, mixed for 15 min, then fed to reactor over 180 minutes. Portion 5 was rinse for portion 4. Portion 6 is charge of initiator and solvents to initiator feed tank with feed to reactor over 240 minutes concurrent with Portion 4. Portion 7 is rinse for Portion 6.

The resulting branched copolymer solution had a 60 wt % solids content and the polymer had the following composition: [70] nBA/AA/MA (45.5/9.0/45.5)//[30] MMA/MAA (71/29) and a weight average molecular weight of 15,500 and a number average molecular weight of 6,300 and polydispersity of 2.5.

Structured Polymer Dispersant 2 {[70] nBA/GMA/MA (45.5/9.0/45.5)//[30] MMA/MAA (71/29)}is an acrylic graft copolymer containing reactive epoxy functionality in its pigment adsorbing backbone prepared in a manner similar to Polymer Dispersant 1. Note in this patent description the dispersant is routinely neutralized. For this inventive ink the dispersants are not neutralized.

Structured Polymer Dispersant 2 was prepared in 2 steps. The first step is the formation of a macromonomer which eventually forms the side chains. The second step is reacting the macromonomer with the backbone constituents to form the macro branched copolymer.

Step 1. Preparation of Macromonomer I: MMA/MAA (71.2/28.8) The macromonomer was prepared from the following ingredients.

Portion 1: Methyl methacrylate (MMA) 142.47 g (grams); Methacrylic acid monomer (MM) 38.33 g Isopropanol 222.75 g Portion 2: Isopropyl-bis(borondifluorodimethyl Glyoxim) 0.01 g Isopropanol 12.73 g 2,2-azobis(2,4-dimethylvaleronitrile) (Vazo® 52 0.17 g by DuPont Co., Wilmington, Del.) Methyl ethyl ketone 9.18 g Portion 3: Isopropanol 10.68 g Portion 4: Methyl ethyl ketone 27.54 g Isopropanol 38.19 g diaquabis(borondifluorodiphenyl glyoximato) 0.03 g cobaltate (II), 2,2'-azobis(2,4-dimethylvaleronitrile) (Vazo 1.91 g)

Portion 5: Methyl methacrylate (MMA) 94.98 g Methacrylic acid (MM) 57.49 g Isopropanol 100.51 g Total 756.97 g Portion 1 was charged to a 12-liter flask (equipped with a thermometer, stirrer, addition funnels, heating mantle, reflux condenser, and nitrogen blanket) and heated under a nitrogen blanket to its reflux temperature in about 20 minutes. Portion 2 was added as one shot and the composition was held at its reflux temperature for about 5 minutes. Portion 3 was used as a rinse for the container and lines from Portion 2. Portion 4 and 5 were added simultaneously while the reaction was held at reflux. The addition of Portion 4 took 330 minutes to complete and addition of portion 5 took 240 minutes to complete.

After adding Portion 4 and Portion 5, the reaction continued for additional 15 minutes at reflux and then cooled to room temperature. The resulting macromonomer solution had the composition of MMA/MAA 71.2%/28.8%). Solvent was stripped off in a vacuum and the macromonomer was used below to form the graft copolymer. The macromonomer had a solids of 38.1%, a weight average molecular weight of 2,000 gm/mole, a number average molecular weight of 4,000 gm/mole and the polydispersity was 2.0.

Step 2. Preparation of Graft Copolymer: [70] nBA/GMA/ MA (45.5/9.0/45.5)//[30] MMA/MAA (71/29)

The graft copolymer was formed by charging a reactor equipped as above and the following ingredients were employed.

Portion 1: n-Butyl Acrylate (nBA) 19.51 g Glycidyl Methacrylate (GMA) 7.21 g Methyl Acrylate (MA) 19.51 g MACROMONOMER I (prepared above) 369.95 g Isopropanol 7.45

Portion 2: Butyl Acetate 15.34 Benzoyl Peroxide 0.37 g

Portion 3: Isopropanol 5.845 g

Portion 4: n-Butyl Acrylate (NBA) 143.06 Glycidyl Methacrylate (GMA), 52.87 g Methyl Acrylate (MA) 143.06 g Portion 5: Isopropanol 10.50 g Portion 6: 2,2'-azobis(2,4-dimethylvaleronitrile) (VaZo™ 52 2.86 g by DuPont Co., Wilmington, Del.) Isopropanol 41.29 g Methyl Ethyl Ketone 10.65 g Portion 7: Isopropanol 8.47 g Total 830.00 g The reactor was inerted with nitrogen. Portion 1 was heated to reflux temperature over a 20 minute period. Portion 2 is the initiator solution and was charged to the reactor in 2 shots with 10 min hold. The reaction was held at reflux for 10 minutes. Portion 3 was rinse for Portion 2. Portion 4 was charged to monomer feed tank, mixed for 15 min, then fed to reactor over 180 minutes.

Portion 5 was rinse for portion 4. Portion 6 is charge of initiator and solvents to initiator feed tank with feed to reactor over 240 minutes concurrent with Portion 4. Portion 7 is rinse for Portion 6.

The resulting branched copolymer solution had a 60 wt % solids content and the polymer had the following composition: [70] nBA/GMA/MA (45.519.0/45.5)//[30] MMA/MAA (71/29).

Structured Polymer Dispersant 3 {[69] nBA/ GMA-POOH/MA(45.5/9.0/45.5)//[31]MMA/CaprolactoneMA (71.25/28.75) [31]}was prepared in 3 steps. The first step is the formation of a macromonomer which eventually forms the side chains. The second step is reacting the macromonomer with the backbone constituents to form the macro branched copolymer. The third step is the reaction of the epoxide group in the backbone with phosphoric acid to form the phosphated graft co-polymer Step 1. Preparation of Macromonomer I: MMA/Caprolactone Methacrylate (71.25/28.75)

The macromonomer was prepared from the following ingredients. Weight (in grams)

Portion 1: Methyl methacrylate (MMA)-776g;

Caprolactone 2-(methylacryloyloxy)ethyl ester-313.36g;

Methyl ethyl ketone-841.73 g.

Portion 2: Isopropyl-bis(borondifluoridemethylglyoximato) Cobaltate (III)—0.0349 g Methyl ethyl ketone-55.12 g 2,2-azobis(2,4-dimethylvaleronitrile) (Vazo® 52 0.17 g by DuPont Co., Wilmington, Del.)—1.1025 g Portion 3: (Rinse) Methyl ethyl ketone-76.90g Portion 4: Methyl ethyl ketone-110.25 g 2,2-azobis(2,4-dimethylvaleronitrile) (Vazo 0.17 g by DuPont Co., Wilmington, Del.)—4.59 g Portion 5: Methyl Methacrylate (MMA)-776.34 g Caprolactone 2-(methylacryloyloxy)ethyl ester-313.36 g; Methyl ethyl ketone-183.74 g Portion 6: Methyl ethyl ketone-45.94 g 2,2-azobis(2,4-dimethylvaleronitrile) (Vazo 0.17 g by DuPont Co., Wilmington, Del.)—1.48 g Total: 3500 g Portion 1 was charged to a 5 liter flask (equipped with a thermometer, stirrer, addition funnels, heating mantles, reflux condenser and nitrogen blanket) and heated under a nitrogen blanket to reflux. Portion 2 was premixed and added as a single shot to the reaction mixture. The composition was held at reflux for 5 minutes. Portion 3 was added after the 5 minute hold as a rinse for the container and lines from Portion 2. Portions 4 and 5 were simultaneously while the reaction was held at reflux. Portion 4 was added over 300 minutes, and Portion 5 was added over 240 minutes. Portion 6 was added to the reaction mixture over 30 minutes, after which the reaction mixture was held at reflux for 45 minutes. The mixture was then cooled to room temperature.

The resulting macromonomer solution had the composition of: MMA/Caprolactone methacrylate (71.25/28.75). The macromonomer was used below to form the graft co-polymer. The macromonomer had a solids of 56%, a weight average molecular weight of 5014, a number average molecular weight of 2990, and a poly dispersity of 1.7.

Step 2. Preparation of Graft Copolymer:

[69] nBA/GMA/MA/(45.5/9.0/45.5)//[31]MMA/CaprolactoneMA(71.25/28.75)

The graft copolymer was formed by charging a reactor equipped as above and the following ingredients were employed.

Weight (in grams)

Portion 1: n-Butyl Acrylate (nBA)-69.49 g Methyl Acrylate (MA)-69.49 g Glycidyl Methacrylate (GMA)-13.74 g MACROMONOMER I (prepared above)-915.38 g Isopropanol-979.15 g Portion 2:lsopropanol-40.13 t-Butyl Peroxypivalate-(75% solution in odorless mineral spirits)-9.27 g Portion 3: n-Butyl Acrylate (nBA)-509.64 g Methyl Acrylate (MA)—509.64 g Glycidyl Methacrylate (GMA)-100.80 g Portion 4: 2,2-azobis(2,4-dimethylvaleronitrile) (Vazo 0.17 g by DuPont Co., Wilmington, Del.)-9.27 g Isopropanol-83.94 g Methyl ethyl ketone-9.11 g Portion 5: 2,2-azobis(2,4-dimethylvaleronitrile) (Vazo 0.17 g by DuPont Co., Wilmington, Del.)-18.52 g Isopropanol-51.99 Methyl ethyl ketone-17.52

Portion 1 was charged to a 5 liter flask (equipped with a thermometer, stirrer, addition funnels, heating mantles, reflux condenser and nitrogen blanket) and heated under a nitrogen blanket to reflux. Portion 2 was premixed. Half the solution was added to the reaction vessel as shot. The mixture was held for 10 minutes at reflux. After 10 minutes, the remaining half of the solution was added as a shot and the mixture was, again, held at reflux for 10 minutes. Portions 3 and 4 are added concurrently to the reaction vessel. Portion 3 was charged to the monomer feed tank, and then fed to the reactor over 180 minutes. Portion 4 was charged to the initiator feed tank and fed to the reactor over 240 minutes.

Portion 5 was added to the reaction vessel over 15 minutes after Portions 3 and 4 have been completed. After Portion 5 has been completely added, the reaction is held at reflux for 120 minutes.

Step 3: Preparation of the Phosphated Graft Co-Polymer: [69] nBA/GMA-POOH/MA(45.5/9.0/45.5)//[31]MMA/CaprolactoneMA(71.25/28.75)

Portion 6: Phosphoric Acid (85%)-92 g

After the graft co-polymer (above) has been completed, the reaction vessel is cooled to 50 C. Portion 6 is added over 15 minutes. After the addition has been completed, the reaction vessel is held at 50 C. for 60 minutes.
Total Reaction=3500 g The resulting phosphated graft co-polymer had a 55% solids content. It had a number average molecular weight of 5950, and a weight average molecular weight of 27500, with a poly dispersity of 4.6.

Structured Dispersant Polymer 4, [60] HEA/nBA (60/40)//MMA/BMA/GMA-POOH (40/40/20) [40], is an example of an anionic graft copolymer containing phosphate acid functionality in the stabilizing arm segment and no acid groups in the adsorbing backbone. This dispersant was prepared in the standard anionic polymerization process described in Polymer dispersant 1. The first step involves the preparation of the MMA/BMA/GMA (40/40/20) macromonomer which was subsequently reacted with phosphoric acid in the second step to form the final macromonomer, MMA/BMA/GMA-POOH (40/40/20). The third step is the formation of the graft copolymer in which HEA (hydroxyethylacrylate) and nBA (n-butyl acrylate) and the macromonomer, MMA/BMA GMA-POOH (40/40/20) undergo polymerization to form the final graft polymer with the composition given above.

Structured Dispersant Polymer 5, [69]nBA/GMA/MA (45.5, 9.0, 45.5)//[31] MMA/MAA (71.25/ 28.75), was prepared in a manner similar to Structured Dispersant Polymer 3 except Acrylic Acid (AA) was substituted for the GMA in the appropriate mole ratio and not further reacted with phosphoric acid.

Titanium dioxide dispersions were prepared from titanium dioxide pigments, dispersants, polymerizable vehicle and optional additives using a Dispermat® High Speed Disperser (HSD), available from VMA-Getzmann GMBH, to premix ingredients followed by media milling using an Eiger minimill, available from Eiger Machinery, Inc. Premixing of all ingredients was performed using a Model AE5-CEX Dispermat operated typically at 2000 rpm with an attached 60 mm Cowels blade. The premix was loaded into a 1-liter stainless steel vessel for media milling.

The viscosity at a specific pigment loading was used to assess dispersant effectiveness. The most effective dispersant or combination of dispersants produced dispersions with the lowest viscosity. Dispersion viscosity was measured using a Brookfield viscometer and model RVTDV-II. Viscosity units are Centipoise (cps).

Titanium Dioxide Pigments

Commercially available titanium dioxide pigments were used. Commercial examples of such coated titanium dioxides include R700 and R900 (alumina-coated, available from E.I. DuPont de Nemours, Wilmington Del.), RDIS (alumina-coated, available from Kemira Industrial Chemicals, Helsinki, Finland), R796 (alumina and phosphate treated from DuPont), R706 (silica and alumina treated, available from DuPont, Wilmington Del.).

Ink Formulation and Evaluation

The inks were prepared by methods known to one skilled in the art, unless otherwise noted. One strategy was to prepare dispersions of the alumina-treated titanium dioxide and, in a separate subsequent step, the ink components were combined and mixed together by ball milling, media milling or other mixing means. In general, 0.8 to 1.0 micron zirconia was used for the milling. After the ink was milled, it was filtered through a 1-micron filter paper to remove the media. If the ink did not filter well, it was not tested in a printer. Alternatively, all of the ink components were combined and processed in dispersion equipment and filtered. In this case, the final filtered ink was obtained from the dispersion step.

The process of identifying the inventive ink consisted of making dispersions with various combinations of titanium dioxide pigments, various dispersants and reactive vehicle components. In order for a titanium dioxide dispersion to have sufficient quality for conversion to an ink formulation, it had to pass several criteria. These criteria included the quality of the titanium dioxide dispersion relative to the particle size, viscosity, 7 and 14 day stability tests in oven at 70° C., ambient temperature measurements after 90 days. When a dispersion met most if not all of these criteria it was considered for conversion to ink.

Preparation of White Dispersions

Dispersion Examples 1-4

The white dispersions were prepared using an HSD, followed by milling in a media mill. White dispersions Examples 1-4 were prepared with 50% titanium dioxide, 1.25% of acidic polyester dispersant, the First Dispersant, 1.25.% of Dispersant Polymer 1 described above (acrylic structured copolymer dispersant, the Second Dispersant), 35.6% of Photomer 4361 and 11.9% ODA blend.

TABLE 3

White Dispersion Examples 1-4, Comparative Dispersion Examples 1-3

| Dispersion Example | Pigment | Dispersant | D/P ratio | Viscosity | % <204 | D50 |
|---|---|---|---|---|---|---|
| 1 | Kemira RDIS | Solsperse 36000 + Dispersant Polymer 1 | 0.25/0.25 | 91@1.5 rpms | 0.00 | 288.1 |
| 2 | R-700 | Solsperse 36000 + Dispersant Polymer 1 | 0.25/0.25 | 308@0.6 rpms | 18.6 | 253.0 |
| 3 | R-796 | Solsperse 36000 + Dispersant Polymer 1 | 0.25/0.25 | 60@1.5 rpms | 5.9 | 302.0 |
| 4 | R-900 | Solsperse 36000 + Dispersant Polymer 1 | 0.25/0.25 | Over 3000 | 24.0 | 763.8 |
| Comp Dispersion 1 | Kemira RDIS | Solsperse 36000 | 0.25 | Over 3000 | 20.2 | 571.9 |
| Comp Dispersion 2 | Kemira RDIS | Solsperse 36000 | 0.5 | 289@1.5 rpms | 0.0 | 278.6 |

TABLE 3-continued

White Dispersion Examples 1-4, Comparative Dispersion Examples 1-3

| Dispersion Example | Pigment | Dispersant | D/P ratio | Viscosity | % <204 | D50 |
|---|---|---|---|---|---|---|
| Comp Dispersion 3 | R-700 | Solsperse 36000 + Dispersant Polymer 1 | 0.25/0.25 | 56@1.5 rpms | 313 | 785 |

For Dispersion Examples 1-4 the combination of the First and Second Dispersant with alumina treated titanium dioxide produced dispersions that were judged to be acceptable for continued evaluation.

Dispersion Examples 6-9

Dispersion Example 6-9 were prepared in a manner similar to Dispersion Example 1 except different Second Dispersants were used in combination with Solsperse 36000, the First Dispersant. Comparative Examples 4-11 are also included. The alumina treated Kemira RDIS Titanium Dioxide was used for the Dispersion Examples and a silica treated titanium dioxide was used for most of the comparative examples. For the structured polymer the structure is noted. These dispersions were stored at room temperature for 3 months and there settling properties were observed.

TABLE 4

Dispersion Examples 6-9 and Comparative Examples 11

| Dispersion | TiO$_2$ | Second Dispersant; Acrylic Structured Copolymer (except where noted) | Observations after 3 months of storage at ambient temperature |
|---|---|---|---|
| Dispersion Ex 1 | Kemira RDIS | Structured Polymer 1 | Good, Very Soft Settle, Easily remixes |
| Dispersion Ex 6 | Kemira RDIS | Structured Polymer 3 | Good, Very Soft Settle, Easily remixes |
| Dispersion Ex 7 | Kemira RDIS | Structured Polymer 2 | Very Good, Slight Separation at top, No hard Settle, Mixes in Easily |
| Dispersion Ex 8 | Kemira RDIS | Structured Polymer 4 | No Good, Hard Settled |
| Dispersion Ex 9 | Kemira RDIS | Structured Polymer 5 | No Good, Hard settled but not as bad as 85A or 85C |
| Comp. Dispersion Ex 1 | Kemira RDIS | Solsperse 36000; only one dispersant | Good, Slight Separation at top, No hard Settle, Mixes in Easily |
| Comp. Dispersion Ex 4 | Kemira RDIS | Solsperse 39000; only one dispersant | No Good, Hard Settled |
| Comp. Dispersion Ex 5 | R-706 | Solsperse 39000; only one dispersant | No Good, Very hard settled |
| Comp. Dispersion Ex 6 | R-706 | Solsperse 36000; only one dispersant | No Good, Very hard settled |
| Comp. Dispersion Ex 7 | R-706 | Structured Polymer 4 | No Good, Very hard settled |
| Comp. Dispersion Ex 8 | R-706 | Structured Polymer 5 | No Good, Very hard settled |
| Comp. Dispersion Ex 9 | R-706 | Structured Polymer 1 | No Good, Hard Settled |
| Comp. Dispersion Ex 10 | R-706 | Structured Polymer 3 | No Good, Gooey hard settled |
| Comp. Dispersion Ex 11 | R-706 | Structured Polymer 2 | No Good, Very hard settled |

For the inventive dispersion each had adequate storage stability to print from an ink jet device, or with minimal agitation could be printed. The comparative examples were judged to fail this criteria and were not printed.

Ink Examples 1-3

Ink examples were prepared for further testing. The titanium dioxide dispersion composition is given in Table 5 and the ink compositions and properties are given in Table 6.

TABLE 5

Titanium Dioxide Dispersion 9 for Ink Examples 10-12

| Component | Amount |
|---|---|
| White pigment Kemira RDIS | 500.00 |
| Solsperse 36000 | 12.50 |
| Structured Polymeric Dispersant 1 | 15.00 |
| 4-Methoxy phenol | 0.33 |
| Photomer 4361 | 346.63 |
| ODA-N | 115.54 |
| Solvent from Dispersant | 10.00 |
| Total | 1000.00 |

Key Physical Properties

| | Ink Example 1 | Ink Example 2 | Ink Example 3 |
|---|---|---|---|
| Surface Tension | 32.56 | 32.54 | 32.88 |
| Viscosity @ 25 C. 12 RPM | 60.00 | 56.00 | 123 @ 3.0 rpm |
| After 7 days of aging in 70 C. oven | | | |
| Surface Tension | 32.23 | NA | NA |
| Viscosity @ 25 C. 12 RPM | 66.5 | NA | NA |
| After 14 days of aging in 70 C. oven | | | |
| Surface Tension | 32.3 | | 32.88 |
| Viscosity @ 25 C. 12 RPM | 66.4 | | 92.3 @ 6.0 rpm |

NA: Not Available

The Ink Examples 1, 2, and 3 had varying amounts of titanium dioxide loading; 11.5, 17.5 and 15% respectively.

TABLE 6

Ink Examples 1, 2 and 3

| Component | Ink Ex 1 | Ink Ex 2 | Ink Ex 3 |
|---|---|---|---|
| White Dispersion | 1150 | 1750 | 30 |
| Laromer LR 8956 | 100 | 100 | 2 |
| TRPGDA | 850 | 637.5 | 14.55 |
| Photomer 4361 | 2350 | 1750 | 40 |
| ESACURE KTO 46 | 200 | 250 | 4.5 |
| TPO | 325 | 487.5 | 8.45 |
| Zonyl FSO-100 | 25 | 25 | 0.5 |
| Total | 5000 | 5000 | 100 |

Key Physical Properties

| | Ink Example 1 | Ink Example 2 | Ink Example 3 |
|---|---|---|---|
| Surface Tension | 32.56 | 32.54 | 32.88 |
| Viscosity @ 25 C. 12 RPM | 60.00 | 56.00 | 123 @3.0 rpm |

After 7 days of aging in 70 C. oven

| | | | |
|---|---|---|---|
| Surface Tension | 32.23 | | |
| Viscosity @ 25 C. 12 RPM | 66.5 | | |

After 14 days of aging in 70 C. oven

| | | | |
|---|---|---|---|
| Surface Tension | 32.3 | | 32.88 |
| Viscosity @ 25 C. 12 RPM | 66.4 | | 92.3 @ 6.0 rpm |

The conductivity of Ink Example 1 was 0.045 micro Siemens. The conductivity of the Photomer 4361 was 0.020 micro Siemens. The conductivity was measured with a EC meter Model1056 from Amber Science INC. Eugene, Oreg.

Preparation of Colored and Black Pigment Dispersions

A black pigment dispersion concentrate was prepared according to the following procedure. A mixture was made containing 675 grams of Solsperse™ 39000 and 67.5 grams of Solsperse™ 5000; 2316.5 grams of Photomer® 4361; and 3.6 grams of 4-methoxylphenol. To the mixture was added, with stirring, 1312.5 grams of Pigment Black 7 to form a slurry. The slurry was processed in a high-speed disperser at 3000 RPM for 2 hours. The slurry was recovered and mixed with an additional 2187.5 grams of Photomer® 4361, which was used to rinse the disperser.

The slurry was charged to a Premier HM1.5 bead mill and processed for 7 passes at about 2400 RPM. The mill contained 0.8 mm YTZ media and the process temperature was maintained between 75-130° F. at a flow rate of 0.5 pV90 sec. During the last grinding pass, 937.5 grams of additional Photomer® 4361 was added. This yielded the final dispersion of black concentrate noted in the following Table 7

TABLE 7

Black Dispersion Concentrate

| Black dispersion concentrate | Weight % |
|---|---|
| Photomer ® 4361 | 72.55 |
| 4-methoxylphenol | 0.05 |
| Solsperse ™ 39000 | 9.00 |
| Solsperse ™ 5000 | 0.90 |
| Pigment Black 7 | 17.50 |

A yellow pigment dispersion having the following composition was prepared using a procedure similar to that described for the black concentrate.

TABLE 8

Yellow Dispersion Concentrate

| Yellow dispersion concentrate | Weight % |
|---|---|
| ODA-N | 71.35 |
| 4-methoxylphenol | 0.04 |
| Solsperse ™ 39000 | 10.00 |
| Solsperse ™ 22000 | 1.11 |
| Pigment Yellow 155 | 17.50 |

A magenta pigment dispersion having the following composition was prepared using a procedure similar to that described for the black concentrate.

TABLE 9

Magenta Dispersion Concentrate

| Magenta dispersion concentrate | Weight % |
|---|---|
| Photomer ® 4361 | 69.97 |
| 4-methoxylphenol | 0.03 |
| Solsperse ™ 39000 | 10.00 |
| Cinquasia RT 355-D | 20 |

A cyan pigment dispersion having the following composition was prepared using a procedure similar to that described for the black concentrate.

TABLE 10

Cyan Dispersion Concentrate

| Cyan dispersion concentrate | Weight % |
|---|---|
| Photomer ® 4361 | 69.97% |
| 4-methoxylphenol | 0.03% |
| Solsperse ™ 39000 | 10.00% |
| Pigment Blue 15:4 | 20% |

Preparation of Inks

The ink formulations in the examples were prepared by mixing together the appropriate pigment concentrate described above with appropriate vehicle and other components.

Adhesion Evaluation

Adhesion of cured samples was evaluated according to ASTM Method D3359. That method provides ratings of 5B-0B with the following definitions.

(5B) The edges of the cuts are completely smooth; none of the squares of the lattice are detached. Qualitatively, this is considered excellent adhesion.

(4B) Small flakes of the coating are detached at intersections; less than 5% of the area affected. Qualitatively, this is considered good adhesion.

(3B) Small flakes of the coating are detached along edges and at intersections of cuts. The area affected is 5-15% of the lattice. Qualitatively, this is considered fair adhesion.

(2B) The coating has flaked along the edges and on parts of the squares. The area affected is 15-35% of the lattice. Qualitatively, this is considered poor adhesion.

(1B) The coating has flaked along the edges of cuts in large ribbons and whole squares have detached. The area affected is 35-65% of the lattice. Qualitatively, this is considered poor adhesion.

(0B) Flaking and detachment worse than grade 1B. Qualitatively, this is considered poor adhesion.

From a practical standpoint, an adhesion rating of 5B or 4B is acceptable, a rating of 3B is marginal and probably unacceptable for most applications, and a rating of 2B or less is unacceptable.

Hardness Evaluation

Adhesion of cured samples was evaluated according to ASTM Method D3363. The hardness rating was determined as "pencil hardness" using a Gradco Pencil Scratch Hardness Kit HA-3363 with the following scale (softest to hardest): 6b, 5b, 4b, 3b, 2b, b, hb, f, h, 2h, 3h, 4h, 5h, 6h, 7h, 8h, 9h.

The relationship of the pencil hardness to practical utility is summarized in the following table. Preferably, the cured ink will have a pencil hardness rating of at least 6h.

TABLE 11

Pencil Hardness and Film Description

| Pencil Hardness | Qualitative Rating | Film Description |
| --- | --- | --- |
| 9h | Excellent | Very durable Film |
| 6h-8h | Good | Durable Film |
| 3h-5h | Fair | Soft film, unacceptable |
| 6b-2h | Poor | Very soft film, unacceptable |

Evaluation of Print Appearance

To evaluate appearance, a print was inspected under low (10×) magnification and with the unaided eye. The following rating scale was applied.

Poor—little ink coalescence, rough surface, much white space apparent giving a mottled appearance (undesirable image quality).

Fair—slightly improved ink coalescence and less surface roughness, but some white space apparent giving a mottled appearance (better but still undesirable image quality).

Good—even coverage, smooth surface, little or no white space apparent and little or no mottling evident (acceptable image quality).

Excellent—fully coalesced ink film, very smooth surface, no white space evident (very desirable image quality).

Viscosity

Viscosity was measured with a Brookfield Viscometer LVDV2+ using Spindle 00 and a UL Adapter with temperature control at 25° C. and at 35° C. Results are reported in cP.

Surface Tension

Surface tension was measured with a Kruss Surface Tensiometer (Wilhelmy Plate Method) at ambient temperature. Results are reported in dynes/cm.

Example White Inks

Ink Examples 1, 2 and 3 were tested and compared to a commercially available white UV ink from TOYO INK America, Addison II, USA. The results of this test is given in Table 12 General Ranking in all categories (Lower number is better).

TABLE 12

Ink Examples 1, 2 and 3 compared to Commercial Toyo Ink

|  | Toyo | Ink Example 1 | Ink Example 2 | Ink Example 3 |
| --- | --- | --- | --- | --- |
| Opacity | 4 | 3 | 1 | 2 |
| Whiteness | 4 | 3 | 1 | 2 |
| Adhesion | 4 | 1 | 2 | 3 |
| Abrasion Resistance | 2 | 1 | 4 | 3 |

Opacity measurements were done using a Technidyne style opacity meter model Opacimeter Model BNL-3 (Technidyne Corp, New Albany Ind., USA). Samples were produced with 100% ink load on a clear Mylar® film. For the Ink Examples 10, 11 and 12 the opacity measured values were 81.1, 88.0, and 87.1 respectively. The Toyo ink was 66.7. The white inks with higher titanium dioxide content produced more opaque printing.

The inks were printed on 6 substrates and the whiteness measured. The numbers reported are Delta E from $L^*=100$, $a^*=0$, $b^*=0$. With the lowest number corresponding to the most white result.

TABLE 13

Ink Example 1, 2 and 3 Whiteness on Various Substrates

| Substrate | Toyo | Ink Example 1 | Ink Example 2 | Ink Example 3 |
| --- | --- | --- | --- | --- |
| Avery Pressure Sensitive | 9.7 | 5 | 5.3 | 4.9 |
| Sintra PVC Board | 10.7 | 6.5 | 5.5 | 6.3 |
| Black Gator Board | 16.1 | 13.7 | 9.9 | 11 |
| Black WaterProof Film | 13 | 14.1 | 10 | 11.7 |
| Yellow Coroplast | 12.8 | 11.5 | 8.9 | 8 |
| Clear Mylar over white card | 18.8 | 10.6 | 8.3 | 8.3 |

Avery Pressure Sensitive - Manufactured by Avery.
Sintra PVC - manufactured by Alcan Composites
Black Gator Board - is really black gatorfoam - manufactured by Alcan Composites
Yellow Coroplas - manufactured by Coroplast
Clear Mylar - manufactured by DuPont Tejin Films.

Abrasion:

Samples were prepared on various substrates using the same printing parameters for each ink and substrate combination. The samples were then subjected to rubbing on a Taber 5700 Linear Abrasion Tester. The test set up is as follows:
Rub until failure
Wear Eraser=CS-10
Stroke Length=1 inch
Velocity=1.31 in/sec.
Load=350 grams

TABLE 14

Inks 10-12 Abrasion Results

| SUBSTRATE | TOYO WHITE | Ink Example 1 | Ink Example 2 | Ink Example 3 |
| --- | --- | --- | --- | --- |
| BLACK FOAM | 118 rubs | 332 rubs | 100 rubs | 89 rubs |
| YELLOW COROPLAST | 145 rubs | 225 rubs | 65 rubs | 365 rubs |
| SINTRA (⅛" PVC BOARD) | 200 rubs | 180 rubs | 214 rubs | 220 rubs |

General performance characteristics are defined as:
Ratings: Rubs until Failure (RUF)
<100, poor; 100<RUF<225, Acceptable; >225, Excellent Example Colored Inks 1

Colored inks of the ink set which includes the white ink 1C, 1M, 1Y and 1K are prepared according to the formulation shown in the following Table 15.

TABLE 15

Colored Inks 1 CMYK

| Ingredient | Ink 1C | Ink 1M | Ink 1Y | 1K |
|---|---|---|---|---|
| Cyan dispersion | 10.0 | | | |
| Magenta dispersion | | 12.5 | | |
| Yellow dispersion | | | 11.4 | |
| Black dispersion | | | | 11.4 |
| ODA-N | 15.0 | 15.0 | 8.4 | 15.0 |
| Photomer ® 4361 | 56.0 | 53.5 | 61.2 | 54.6 |
| SR 492 | 10.0 | 10.0 | 10.0 | 10.0 |
| Irgacure ® 369 | 5.0 | 5.0 | 5.0 | 5.0 |
| ITX | 1.0 | 1.0 | 1.0 | 1.0 |
| EDB | 3.0 | 3.0 | 3.0 | 3.0 |

Samples were prepared from these inks by draw-down on Arlon flexible vinyl using a #6 Meyer rod.

Samples were cured in a Fusion UV Systems LC-6B Benchtop Conveyor using an LH-6 lamp with a D bulb and variable irradiance output. Exposure was controlled by conveyor speed through the curing zone. Energy output, measured in mJ/cm$^2$, was determined at a conveyor speed of 20 FPM (feet per minute) using a radiometer puck for UVA, UVB, UVC and UVV. The conveyor system had a digital readout of the system speed that was used to determine relative cure speeds and cure energies. Cure energies at higher or lower cure speeds were based on the calculated ratios of the energy outputs measured at 20 FPM.

Curing results are shown in the following tables.

TABLE 16

Colored Ink Performance

| Sample | UVA Irr. (W/cm$^2$) | UVA Energy (mJ/cm$^2$) | Cure Speed (FPM) | Adhesion | Hardness |
|---|---|---|---|---|---|
| Colored Ink 1C | 3.5 | 367 | 60 | 5b | 9h |
| Colored Ink 1M | 3.5 | 400 | 60 | 5b | 9h |
| Colored Ink 1Y | 3.6 | 480 | 50 | 5b | 9h |
| Colored Ink 1K | 3.5 | 367 | 60 | 4b | 9h |
| Colored Ink 1C | 1.6 | 350 | 40 | 5b | 9h |
| Colored Ink 1M | 2.4 | 350 | 40 | 5b | 9h |
| Colored Ink 1Y | 2.4 | 350 | 40 | 5b | 9h |
| Colored Ink 1K | 2.4 | 280 | 50 | 4b | 9h |
| Colored Ink 1C | 1.6 | 333 | 30 | 5b | 9h |

TABLE 16-continued

Colored Ink Performance

| Sample | UVA Irr. (W/cm$^2$) | UVA Energy (mJ/cm$^2$) | Cure Speed (FPM) | Adhesion | Hardness |
|---|---|---|---|---|---|
| Colored Ink 1M | 1.5 | 333 | 30 | 5b | 9h |
| Colored Ink 1Y | 1.6 | 333 | 30 | 5b | 9h |
| Colored Ink 1K | 1.6 | 333 | 30 | 4b | 2h |

The inventive inks cure rapidly and provide good-excellent adhesion (indicative of good "through-cure") and excellent hardness (indicative of good "surface-cure"). Furthermore, the curing energy for all four colors in the colored ink set are approximately the same at each irradiance level. It thus requires the same approximate curing energy for all the irradiances shown (e.g. about 2.4 and 1.6 W/cm$^2$). This illustrates no problem with reciprocity.

The inventive inks are advantageous, relative to the comparative inks, in adhesion/through-cure and reciprocity.

Example Colored Inks 2

Colored Inks 2a-2f with varying levels and ratios of fluro surfactant (Zonyl® FSO-100) and acetylene diol surfactant (Surfynol® 104), as shown in the following table, were prepared and jetted with a CromaPrint 22UV (E. I. du Pont de Nemours and Company, Wilmington, Del., USA). The printhead was heated to about 40° C., the drop size was about 30 ng, the print mode was 600 by 800 dpi, and the pattern was a solid block at 100% coverage. The substrates were PVC (polyvinyl chloride) board, adhesive backed vinyl film (Avery Corp.) and polycarbonate sheet.

Results showed that the prescribed surfactant blend provided good to excellent appearance across the range of substrates tested. In this formulation, it was most advantageous for the fluoro surfactant to be present at levels of at least about 1.5 wt %, and the acetyleneic diol to be present at levels of at least about 0.5 wt %.

In actual practice, the ratio and level of surfactant needed for optimum performance may vary depending on the particular formulation. Routine experimentation will reveal the most appropriate levels. In some cases, surfactant levels in substantial excess of what is needed for proper spreading can be detrimental to image quality and durability.

The pigment and dispersant in each case was the cyan pigment and dispersant from the cyan dispersion concentrate above. The Colored Ink 2f formulation was also used to prepare magenta, yellow and black inks using the magenta, yellow and black concentrates above in place of the cyan. Similar excellent appearance was obtained for these other colors as well.

TABLE 17

Cyan Ink Compositions.

| | Colored Ink 2a | Colored Ink 2b | Colored Ink 2c | Colored Ink 2d | Colored Ink 2e | Colored Ink 2f |
|---|---|---|---|---|---|---|
| Ingredients | | | | | | |
| Cyan Pigment | 2.0 | 2.0 | 2.0 | 2.0 | 2.0 | 2.0 |
| Solsperse ™ 39000 | 1.0 | 1.0 | 1.0 | 1.0 | 1.0 | 1.0 |
| Photomer ® 4361 | 61.5 | 61.0 | 60.5 | 61.0 | 60.5 | 60.0 |
| ODA-N | 15.0 | 15.0 | 15.0 | 15.0 | 15.0 | 15.0 |

TABLE 17-continued

| | Cyan Ink Compositions. | | | | | |
|---|---|---|---|---|---|---|
| | Colored Ink 2a | Colored Ink 2b | Colored Ink 2c | Colored Ink 2d | Colored Ink 2e | Colored Ink 2f |
| SR 492 | 10.0 | 10.0 | 10.0 | 10.0 | 10.0 | 10.0 |
| Irgacure ® 369 | 5.0 | 5.0 | 5.0 | 5.0 | 5.0 | 5.0 |
| EDB | 3.0 | 3.0 | 3.0 | 3.0 | 3.0 | 3.0 |
| ITX | 1.0 | 1.0 | 1.0 | 1.0 | 1.0 | 1.0 |
| Zonyl ® FSO-100 | 1.0 | 1.5 | 2.0 | 1.0 | 1.5 | 2.0 |
| Surfynol ® 104 | 0.5 | 0.5 | 0.5 | 1.0 | 1.0 | 1.0 |
| Physical Properties | | | | | | |
| Surface tension | 27.4 | 23.5 | 23.1 | 25.6 | 23.4 | 22.8 |
| Viscosity 30 rpm@35° C. | 13.4 | 13.2 | 13.5 | 13.7 | 13.1 | 13.4 |
| Appearance | | | | | | |
| PVC Board | Fair | Good | Good | Good | Good | Excellent |
| Avery Vinyl | Fair | Fair | Fair | Fair | Good | Excellent |
| Polycarbonate | Excellent | Excellent | Excellent | Excellent | Excellent | Excellent |

Example 3

Colored Inks 3a-3c, shown in the following table, were prepared and printed in the same manner as the previous example. This demonstrated that the use of a different acetylenic diol surfactant (Dynol™ 604) in combination with a fluoro surfactant also gave good results over a range of substrates.

TABLE 18

| | Cyan inks Composition | | |
|---|---|---|---|
| | Colored Ink 3a | Colored Ink 3b | Colored Ink 3c |
| Ingredients | | | |
| Cyan Pigment | 2.0 | 2.0 | 2.0 |
| Solsperse ™ 39000 | 1.0 | 1.0 | 1.0 |
| Photomer ® 4361 | 61.0 | 60.5 | 60.0 |
| ODA-N | 15.0 | 15.0 | 15.0 |
| SR 492 | 10.0 | 10.0 | 10.0 |
| Irgacure ® 369 | 5.0 | 5.0 | 5.0 |
| EDB | 3.0 | 3.0 | 3.0 |
| ITX | 1.0 | 1.0 | 1.0 |
| Zonyl ® FSO-100 | 1.0 | 1.5 | 2.0 |
| Dynol ™ 604 | 1.0 | 1.0 | 1.0 |
| Physical Properties | | | |
| Surface tension | 26.22 | 25.59 | 23.83 |
| Viscosity 30 rpm@35° C. | 13.6 | 13.4 | 13.5 |
| Appearance | | | |
| PVC Board | Poor | Fair | Good |
| Avery Vinyl | Poor | Fair | Good |
| Polycarbonate | Fair | Good | Excellent |

The invention claimed is:

1. A radiation curable ink composition for ink jet recording comprising
   a. at least one titanium dioxide white pigment
   b. a polymerizable vehicle
   c. at least one additional ingredient selected from the group of consisting of a colorant, a photosensitizer, a photosynergist, a photoinitiator and a surfactant,
   d. at least one of the titanium dioxide pigments is alumina-treated and stabilized by a mixture of pigment dispersants consisting essentially of
      i. at least a first acidic polyester dispersant, and
      ii. at least an second acrylic structured copolymer dispersant,
   wherein the radiation curable ink composition is substantially free of solvent, and wherein the polymerizible vehicle is a mixture of mono-functional and multi-functional monomers and the mixture of monomers is at least 50 weight % by weight of the total weight of the ink.

2. The radiation curable ink composition of claim 1 ratio of the acidic polyester dispersant and acrylic structured copolymer dispersant dispersants is 1:10 to 10:1 by weight.

3. The radiation curable ink composition of claim 1 where the structured copolymer dispersant is a structured block copolymer dispersant chosen from AB, BAB and ABC block polymers.

4. The radiation curable ink composition of claim 1 where the structured copolymer dispersant is a graft copolymer.

5. The graft copolymer of claim 3 where at least one of the monomers used can contain a UV reactive component.

6. The radiation curable ink composition of claim 1 where the composition has no added conductive agents and has a conductivity of less than 0.075 micro Siemans.

7. An ink set comprising the radiation curable ink composition of claim 1 and plurality of colored, pigmented inks.

8. A method for ink jet printing onto a substrate, comprising the steps of:
   (a) providing an ink jet printer that is responsive to digital data signals;
   (b) loading the printer with a substrate to be printed;
   (c) loading the printer with a radiation curable white inkjet ink set as set forth in claim 7; and
   (d) printing onto the substrate using said inkjet ink or inkjet ink set, in response to the digital data signals, and forming thereby a printed article.

9. The method of claim 8, wherein the substrate is selected from the group polycarbonate, polyvinyl chloride board, pressure sensitive adhesive-backed vinyl, polystyrene, foam boards and plywood.

10. The method of claim 8 or claim 9, further comprising the step of exposing the printed article to radiation suitable for curing the ink printed thereon.

11. The method of claim 10, wherein the radiation is ultra-violet light.

* * * * *